(No Model.)
T. B. JEFFERY.
INFLATION VALVE FOR PNEUMATIC TIRES.
No. 549,603. Patented Nov. 12, 1895.
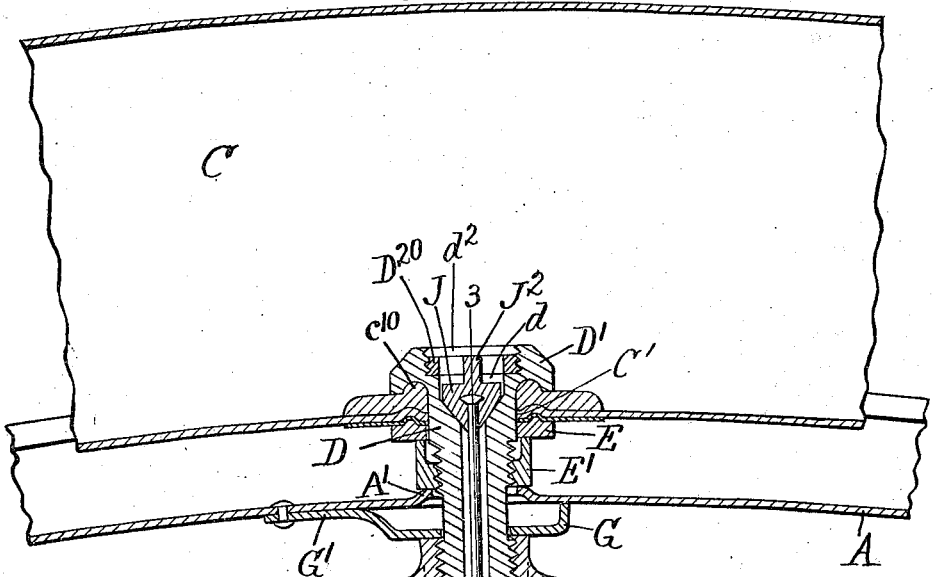
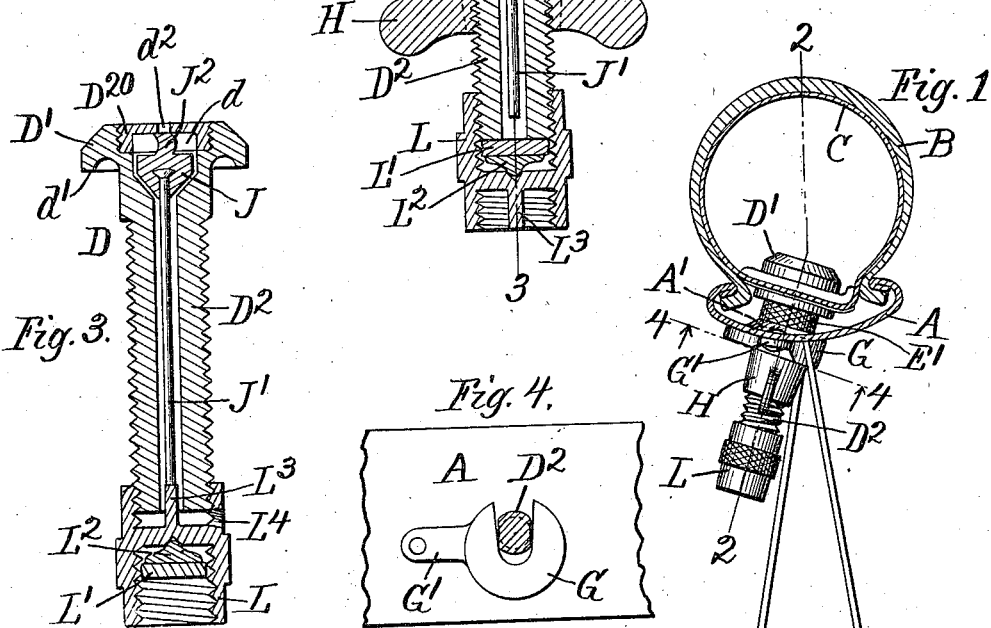
Witnesses.
E. T. Wray
Jean Elliott
Inventor.
Thos. B. Jeffery
by Burton W Burton
his attys.

UNITED STATES PATENT OFFICE.

THOMAS B. JEFFERY, OF CHICAGO, ILLINOIS.

INFLATION-VALVE FOR PNEUMATIC TIRES.

SPECIFICATION forming part of Letters Patent No. 549,603, dated November 12, 1895.

Application filed February 15, 1894. Serial No. 500,230. (No model.)

*To all whom it may concern:*

Be it known that I, THOMAS B. JEFFERY, a citizen of the United States, residing at Chicago, county of Cook, and State of Illinois, have invented certain new and useful improvements in Inflation-Valves for Pneumatic Tires, which is fully set forth in the annexed specification, reference being had to the accompanying drawings, forming a part thereof.

In the drawings, Figure 1 is a detail section, transverse with respect to the rim and tire of a wheel provided with my improvement, which is shown in elevation. Fig. 2 is an enlarged section at the line 2 2 on Fig. 1, being axial longitudinally with respect to the inflating device, the sheath being omitted. Fig. 3 is a detail section at the line 3 3 on Fig. 2 of the neck and head of the valve-body and the inverted cap which, when applied inverted, forces the valve off its seat to permit the inflated core to vent. Fig. 4 is a detail section at the line 4 4 on Fig. 1.

A is the rim of the wheel, adapted to hold a tire, which comprises the outer sheath or cover B and the pneumatic or inflatable core C.

D is the nozzle of the inflating apparatus, which, because it contains the check-valve which retains the air under pressure within the core, is, for convenience, referred to as the "valve-body." It comprises the head D' and the neck or stem $D^2$, the head being intended to be inserted through an aperture C' in the core C, the material of which will stretch to allow the head to pass through the aperture and contract so as to fit snugly around the neck, and the head co-operates with the washer E and nut $E'$ applied upon the neck outside the core C to clamp the margin of the aperture tightly.

One feature of my invention consists in cupping or hollowing the under shoulder of the head or the face of the part which binds on the opposite side, or both of those parts, so that they shall bind upon the substance of the inflatable core at a little distance back from the margin of the aperture, and thereby tend to crowd the material in toward the aperture instead of stretching it away from it, which would enlarge the aperture, and which would be the result of an attempt to clamp or bind the material between flat faces or shoulders around the aperture.

In the drawings I have shown both the shoulder $d'$ of the under side of the head D', the face of the washer E, cupped or hollowed as described, and it is preferable thus to treat both the binding-surfaces. In order that the edges of the washer and head thus cupped or hollowed may not cut or weaken the fabric of the core where they bind upon it at a little distance from the margin of the aperture, I prefer to reinforce the fabric of the core by thickening it for some distance around the aperture greater than the radius of the head and washer; and in order more fully both to prevent the stretching of the aperture and also the cutting of the fabric where the clamping parts bind it, I prefer to throw up a bead $c^{10}$ immediately around the margin of the aperture, which obtains a seat in the hollow of the cupped head or washer, or both. In order that the head D' may not prevent the proper engagement and action of the cover B, with relation to the rim A, it should be as small as possible consistent with its function of clamping the inflatable core; also, in order that it may clamp securely, its under face or shoulder, which has the function of binding the substance of the core around the aperture, should be as broad as possible. Between the demand for a narrow head and a broad shoulder on the under side of the head it becomes compulsory to make the neck as small as possible; yet the neck must contain the tubular aperture for the air and the whole device must be incapable of being rotated with respect to the rim, or the action of connecting the pump to the protruding end of the neck would twist the core and ruin it, and would also tend to unscrew any clamping-nut employed inside the rim to clamp the core. Since the neck must be inserted through the opening which may be provided for it in the rim from the inner side, or side toward the tire, it cannot be made incapable of turning in the opening through which it is thus inserted, except by having at that point a non-circular cross-section of a form which might be circumscribed about the smaller circular end portion which protrudes from the inner side of the rim; but if it is thus made larger at this part than at the protruding part the clamping-nut must be provided with a seat upon a threaded portion on the stem large enough to circumscribe the non-circular enlargement and thereby the stem at the point, where it should be as small as possible in order to leave as broad a shoulder as possible, for the head would be larger by two increments than the protruding portion of the stem, one increment being that which would have been added to make it non-circular and prevent the stem from turning in the rim and the other increment that added to the first to obtain a circular outline, circumscribing the first non-circular enlargement. In order to avoid both these enlargements and make the stem at the inner part next the head no larger than it must be at the protruding end where the pump screws onto it, I thread the stem uniformly and continuously from the end back toward the shoulder, and then cut it away to produce two flat sides for a little distance just beyond the nut E'—that is, at a portion which will protrude through the rim—and on the rim I provide a latch or catch in the form of a slotted washer, adapted to be passed onto the stem at the flattened part, and this washer being made fast to the rim eccentrically with respect to the opening through which the neck of the valve-body is inserted, prevents the latter from turning when the latch has been passed onto its flattened portion. Most conveniently the washer G is pivotally attached to the rim, having a stem or handle G' for that purpose.

It is necessary that the neck should protrude in such direction that the pump can be attached without interfering with the spokes, which, as is well understood, diverge from the rim toward the opposite ends of the hub, and therefore the neck and pump when attached extend at an oblique angle to the plane of rotation of the wheel, as seen in Fig. 1. In order that the valve-body may assume this position when secured to the rim, the latter being too thin to afford, by means of the walls of the aperture through which the neck is inserted, the necessary guidance to give the desired direction to the protruding neck, I strike up from the outer surface of the rim toward the inner or concave side a boss A' around the margin of the aperture, the boss being higher at one side than at the other, so that it forms a shoulder oblique to the original direction of the metal at that point, but at right angles to the direction in which it is desired to have the nozzle and pump when attached project. Any expedient by which the nozzle-neck is clamped tightly, so that the under head of the nut E' is brought against the shoulder of the boss A', will insure the proper direction to the nozzle; but this is more effectually secured if the clamp-nut on the outer side also operates against a shoulder parallel with that of the boss. I employ a thumb-nut for this purpose on the neck outside the washer G, and I form the washer of such shape with respect to the shape of the rim where the washer seats upon it that the outer face of the washer when it is thus seated is parallel with the shoulder of the boss A', and thereby, when the thumb-nut H is clamped, it compels the neck to assume the desired oblique direction.

J is a check-valve which seats at the inner end of the longitudinal duct through the neck D². It has a long needle-stem J', which extends through the duct, not occupying so much of it, but there still remains ample space for the passage of air. The valve, with this stem, is inserted from the head end through the head D', in which its chamber d is formed, and it is retained in place therein by the cap-plate D²⁰, which is screwed into the head after the valve is put in place, this cap-plate having the slot d², which serves both the purpose of permitting the passage of air and also affording engagement for a suitable tool to screw the head in place. The valve-head J, which is of rubber, is preferably provided with a slender rubber terminal J² at its outer side—that is, opposite the stem—which, when the valve is on its seat, touches the inner face of the cap-plate E²⁰, so that the valve is held normally seated; but the terminal being quite flexible readily bends when the pump is forcing the air in past the valve to permit the latter to leave its seat sufficiently for inflation.

L is a cap employed to close the outer end of the neck D² when the pump is detached after inflation is completed. In the cap there is a rubber gasket L', which makes an airtight joint with the end of the neck when the cap is screwed onto it, thereby supplementing the check-valve and preventing any escape of air, even though the latter should leak. This gasket would be liable to be ground away by the friction between it and the end of the neck upon one side and the bottom of the cap on the other side; or, if too elastic to be ground by that action, would be distorted, so that it would not serve its purpose of making an airtight seating but for a device which I provide to prevent it from being thus ground between the two surfaces when the cap is screwed on. This device consists in a conical metal base or turn-block L², whose apex seats in a center socket at the bottom of the cap and whose base supports the gasket. When the cap is screwed on, as soon as the gasket comes into contact with the end of the neck D', as soon as the friction between the gasket and the neck becomes greater than the friction of the point of the cone L² in its seat, (the latter friction being very slight,) the gasket will cease to turn with the cap, and instead the cap will turn with the point of the cone so that the gasket will be squeezed directly between the end of the neck upon one side and the base of the cone upon the other side, all wearing-friction being thus prevented.

The cap is reversible—that is, the opposite end from that already described—is also interiorly threaded to fit the end of the neck, but it is made with a slender pin or spindle L³, projecting at the center and adapted to enter the bore of the neck when that end of the cap is screwed onto the latter. The stem J' of the valve J protrudes so far into the stem that when this end of the cap is screwed into the end of the neck the pin L³ projecting into the bore, reaches and pushes on the end of the stem J' and unseats the valve J. A vent-aperture L⁴ is provided in the cap, leading from the outer surface into the threaded cavity which has the center-pin L³, and when the latter has thus pushed the valve off its seat the air escaping past the valve finds vent through this aperture L⁴. This affords a convenient means of relieving the pressure from the inflated core without detaching and leaving detached the cap, which would be liable to be mislaid or lost while waiting for the core to vent, but which, with this structure, is always kept safely in place.

I claim—

1. In combination with the rim and the inflatable tire core, the inflating nozzle having a neck which penetrates the wall of the core, and a shoulder on the inner side of said wall, the neck being continuously threaded from the outer end toward the shoulder; a nut on the neck between the core and the rim, and a second nut outside the rim; and a catch between the rim and the outer nut to prevent the nozzle from turning in the rim: substantially as set forth.

2. In combination with the rim and the inflatable core, the inflating nozzle penetrating the rim, said rim having a shoulder struck up in the metal thereof about the aperture at which the nozzle penetrates it, in a plane oblique to the plane of rotation of the wheel, and clamping devices which secure the nozzle to the rim adapted to bind against such oblique shoulder to cause the nozzle neck or stem to protrude obliquely divergent from the plane of rotation of the wheel: substantially as set forth.

3. In combination with the rim and the inflatable core, the inflating nozzle penetrating the rim, the aperture through which it extends being surrounded by an inwardly struck boss oblique to the plane of rotation of the wheel; a washer on the outside of the rim having one face shaped to the rim and the other face flat and adapted to be parallel with the face of the boss when the face of said washer which is shaped to the rim is suitably seated on the latter, and clamping nuts on the neck of the nozzle, one outside and the other inside of the rim, adapted to bind against the washer and the boss on their parallel faces respectively: substantially as set forth.

4. In combination with the rim and the inflatable core, a nozzle provided with a nut to clamp it to the core and having its neck which penetrates the rim continuously threaded, and provided with a device for clamping it to the rim located exteriorly to the latter, whereby the nut which clamps the core may be as small as that which clamps the rim, the neck having its thread cut away outside the rim and adjacent thereto to form a flat seat on the side of the neck, and a latch pivoted to the rim and adapted to engage the flat seat to prevent the rotation of the nozzle in the rim: substantially as set forth.

5. In combination with a nozzle having a check valve at the inner end adapted to seat outward and having a stem which extends into the nozzle neck; a suitably threaded cover adapted to have either end screwed to the end of the neck, and provided with a center pin at one end which projects into the socket of the neck and encounters the end of the stem as the cover is screwed on, to force the valve off its seat; the valve stem not protruding from the end of the neck and the other end of the cover being adapted thereby to be screwed down without encountering said stem: substantially as set forth.

6. In combination with the nozzle having a valve chamber at the inner end, the valve located in such chamber and seating outward and provided with a stem which extends outward through the neck of the nozzle; a cap plate at the inner end of the valve chamber, the valve being provided with an inwardly extending flexible projection adapted to be normally in contact with the cap plate when the valve is seated, but to yield to permit the valve to be forced off its seat: substantially as set forth.

In testimony whereof I have hereunto set my hand, in the presence of two witnesses, at Chicago, Illinois, this 13th day of February, 1894.

THOS. B. JEFFERY.

Witnesses:
CHAS. S. BURTON,
JEAN ELLIOTT.